United States Patent
Nicolaescu

(10) Patent No.: US 6,798,964 B2
(45) Date of Patent: Sep. 28, 2004

(54) METHOD AND APPARATUS FOR MODULATING AN OPTICAL BEAM IN AN OPTICAL DEVICE

(75) Inventor: Remus Nicolaescu, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 234 days.

(21) Appl. No.: 10/138,138

(22) Filed: May 1, 2002

(65) Prior Publication Data

US 2003/0206709 A1 Nov. 6, 2003

(51) Int. Cl.[7] ............................................. G02B 6/10
(52) U.S. Cl. ................................... 385/131; 385/2
(58) Field of Search ....................... 385/2–3, 129–132; 257/79, 25, 9

(56) References Cited

U.S. PATENT DOCUMENTS

| | | | |
|---|---|---|---|
| 4,923,264 A | | 5/1990 | Langer et al. |
| 4,939,556 A | * | 7/1990 | Eguchi et al. ............... 257/25 |
| 5,274,246 A | | 12/1993 | Hopkins et al. |
| 5,455,876 A | * | 10/1995 | Hopfer et al. ............... 385/2 |
| 6,215,585 B1 | | 4/2001 | Yoshimura et al. |
| 6,233,378 B1 | | 5/2001 | Sun |
| 6,236,774 B1 | | 5/2001 | Lackritz et al. |
| 6,246,815 B1 | | 6/2001 | Fujiwara et al. |
| 6,285,043 B1 | | 9/2001 | Yap |
| 6,304,690 B1 | | 10/2001 | Day |
| 6,310,700 B1 | | 10/2001 | Betts |
| 6,310,999 B1 | | 10/2001 | Marcuse et al. |
| 6,324,328 B1 | | 11/2001 | Mehlhorn et al. |
| 6,330,376 B1 | | 12/2001 | Paniccia |
| 6,343,171 B1 | | 1/2002 | Yoshimura et al. |

OTHER PUBLICATIONS

Tanya M. Monro, et al., "Holey Fibers with Random Cladding Distributions," Optics Letters, Feb. 15, 2000, pp. 206–208, vol. 25, No. 4, Optical Society of America, 2000.

A.M. Zheltikov, "Reviews of Optical Problems: Holey Fibers," Physics—Uspekhi, pp. 1125–1136, vol. 42, No. 11, Uspekhi Fizicheskikh Nauk, Russian Academy of Sciences, 2000.

Jeff Hecht, "Holey Fibers Cut Their Losses," Apr. 17, 2001, http://www.techreview.com/articles/hecht041701.asp.

E.D. Novak, et al., "Speed, Power, and Yield Comparison of Thin Bonded SOI versus Bulk SMOS Technologies," Proceedings 1994 IEEE International SOI Conference, Oct. 1994, VLSI Technology, Inc., San Jose, CA, pp. 41–42.

* cited by examiner

Primary Examiner—John D. Lee
Assistant Examiner—Eric Wong
(74) Attorney, Agent, or Firm—Blakley, Sokoloff, Taylor & Zafman LLP

(57) ABSTRACT

An apparatus and method for modulating a phase of optical beam. In one embodiment, an apparatus according to embodiments of the present invention includes a plurality of alternating layers of semiconductor material and insulating material. The apparatus further includes a plurality of conductors, each of the conductors coupled to a respective one of the layers of semiconductor material to modulate charge layers proximate to the layers of insulating material. An optical path is included along the plurality of alternating layers of semiconductor material and insulating material and through the modulated charge layers. A phase of an optical beam directed along the optical path through the modulated charge layers is modulated in response to the modulated charge layers.

23 Claims, 6 Drawing Sheets

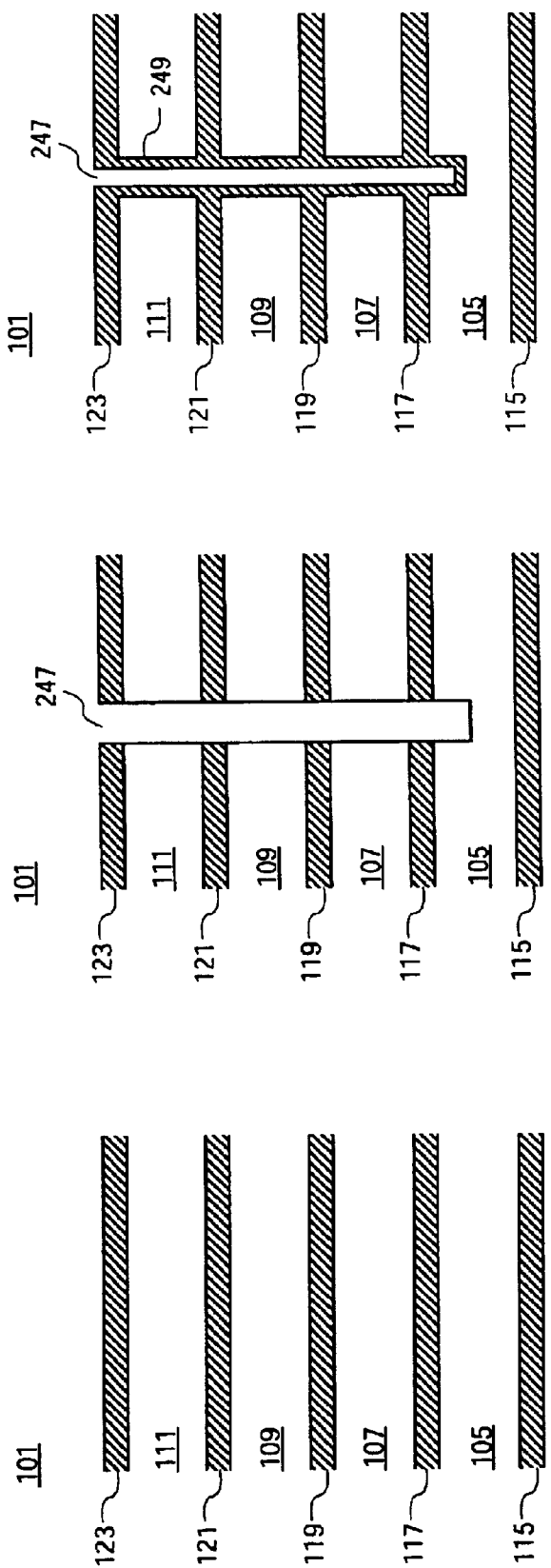

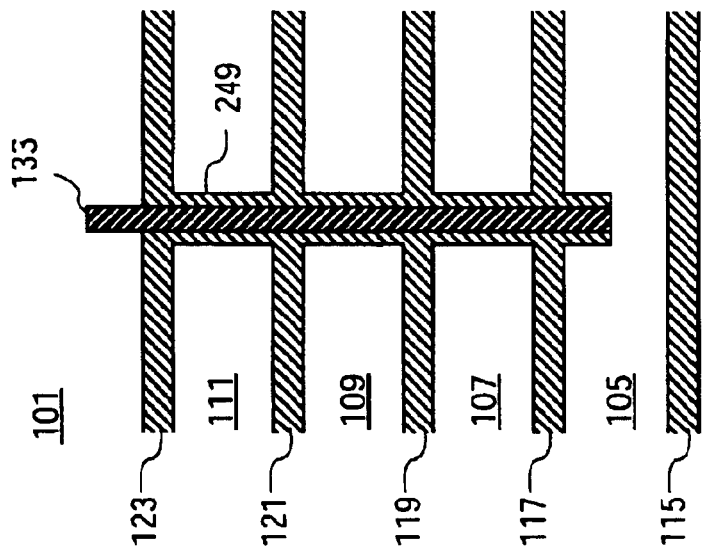
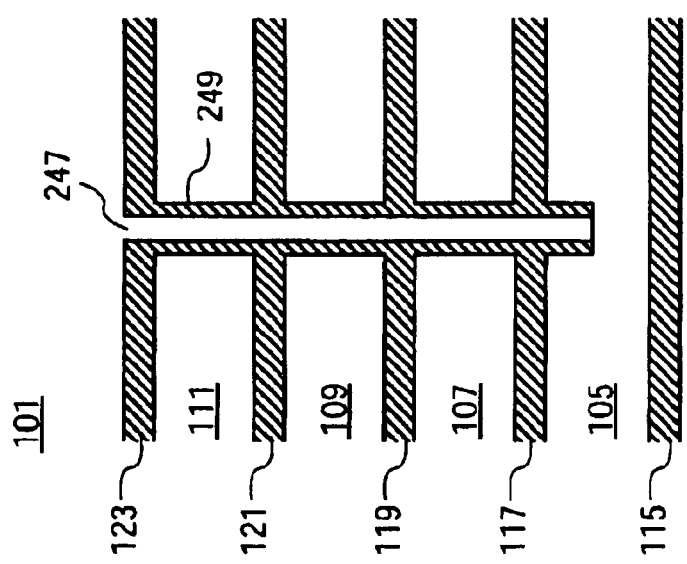

METHOD AND APPARATUS FOR MODULATING AN OPTICAL BEAM IN AN OPTICAL DEVICE

BACKGROUND OF THE INVENTION

1. Field of the Invention

The present invention relates generally to optics and, more specifically, the present invention relates to modulating optical beams.

2. Background Information

The need for fast and efficient optical-based technologies is increasing as Internet data traffic growth rate is overtaking voice traffic pushing the need for optical communications. Transmission of multiple optical channels over the same fiber in the dense wavelength-division multiplexing (DWDM) systems and Gigabit (GB) Ethernet systems provide a simple way to use the unprecedented capacity (signal bandwidth) offered by fiber optics. Commonly used optical components in the system include wavelength division multiplexed (WDM) transmitters and receivers, optical filter such as diffraction gratings, thin-film filters, fiber Bragg gratings, arrayed-waveguide gratings, optical add/drop multiplexers, lasers and optical switches. Optical switches may be used to modulate optical beams. Two commonly found types of optical switches are mechanical switching devices and electro-optic switching devices.

Mechanical switching devices generally involve physical components that are placed in the optical paths between optical fibers. These components are moved to cause switching action. Micro-electronic mechanical systems (MEMS) have recently been used for miniature mechanical switches. MEMS are popular because they are silicon based and are processed using somewhat conventional silicon processing technologies. However, since MEMS technology generally rely upon the actual mechanical movement of physical parts or components, MEMS are generally limited to slower speed optical applications, such as for example applications having response times on the order of milliseconds.

In electro-optic switching devices, voltages are applied to selected parts of a device to create electric fields within the device. The electric fields change the optical properties of selected materials within the device and the electro-optic effect results in switching action. Electro-optic devices typically utilize electro-optical materials that combine optical transparency with voltage-variable optical behavior. One typical type of single crystal electro-optical material used in electro-optic switching devices is lithium niobate (LiNbO$_3$).

Lithium niobate is a transparent, material that exhibits electro-optic properties such as the Pockels effect. The Pockels effect is the optical phenomenon in which the refractive index of a medium, such as lithium niobate, varies with an applied electric field. The varied refractive index of the lithium niobate may be used to provide switching. The applied electrical field is provided to present day electro-optical switches by external control circuitry.

Although the switching speeds of these types of devices are very fast, for example on the order of nanoseconds, one disadvantage with present day electro-optic switching devices is that these devices generally require relatively high voltages in order to switch optical beams. Consequently, the external circuits utilized to control present day electro-optical switches are usually specially fabricated to generate the high voltages and suffer from large amounts of power consumption. In addition, integration of these external high voltage control circuits with present day electro-optical switches is becoming an increasingly challenging task as device dimensions continue to scale down and circuit densities continue to increase.

BRIEF DESCRIPTION OF THE DRAWINGS

The present invention is illustrated by way of example and not limitation in the accompanying figures.

FIGS. 2A through 2E are diagrams illustrating one embodiment of a process to dispose a conductor in an optical device to electrically couple one of the layers of semiconductor material to receive a signal in accordance with the teachings of the present invention.

DETAILED DESCRIPTION

Methods and apparatuses for modulating an optical beam in an optical device are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. In addition, it is appreciated that the figures provided herewith are for explanation purposes to persons ordinarily skilled in the art and that the drawings are not necessarily drawn to scale.

In one embodiment of the present invention, a semiconductor-based optical device is provided in a fully integrated solution on a single integrated circuit chip. One embodiment of the presently described optical device includes a semiconductor-based waveguide having stacked capacitor-type structure. For instance, in one embodiment, the optical device includes a plurality of alternating or stacked layers of semiconductor material and insulating material. Conductors are electrically coupled to each respective one of the layers of semiconductor material to modulate charge layers proximate to the insulating material layers between the neighboring layers of semiconductor material in response to a signal received or applied to the conductors. An optical path is directed along the plurality of alternating layers of semiconductor material and insulating material and through the modulated charge layers. As a result, a phase of an optical beam directed through the optical path is modulated in response to the modulated charge layers or signal.

Figure 1:
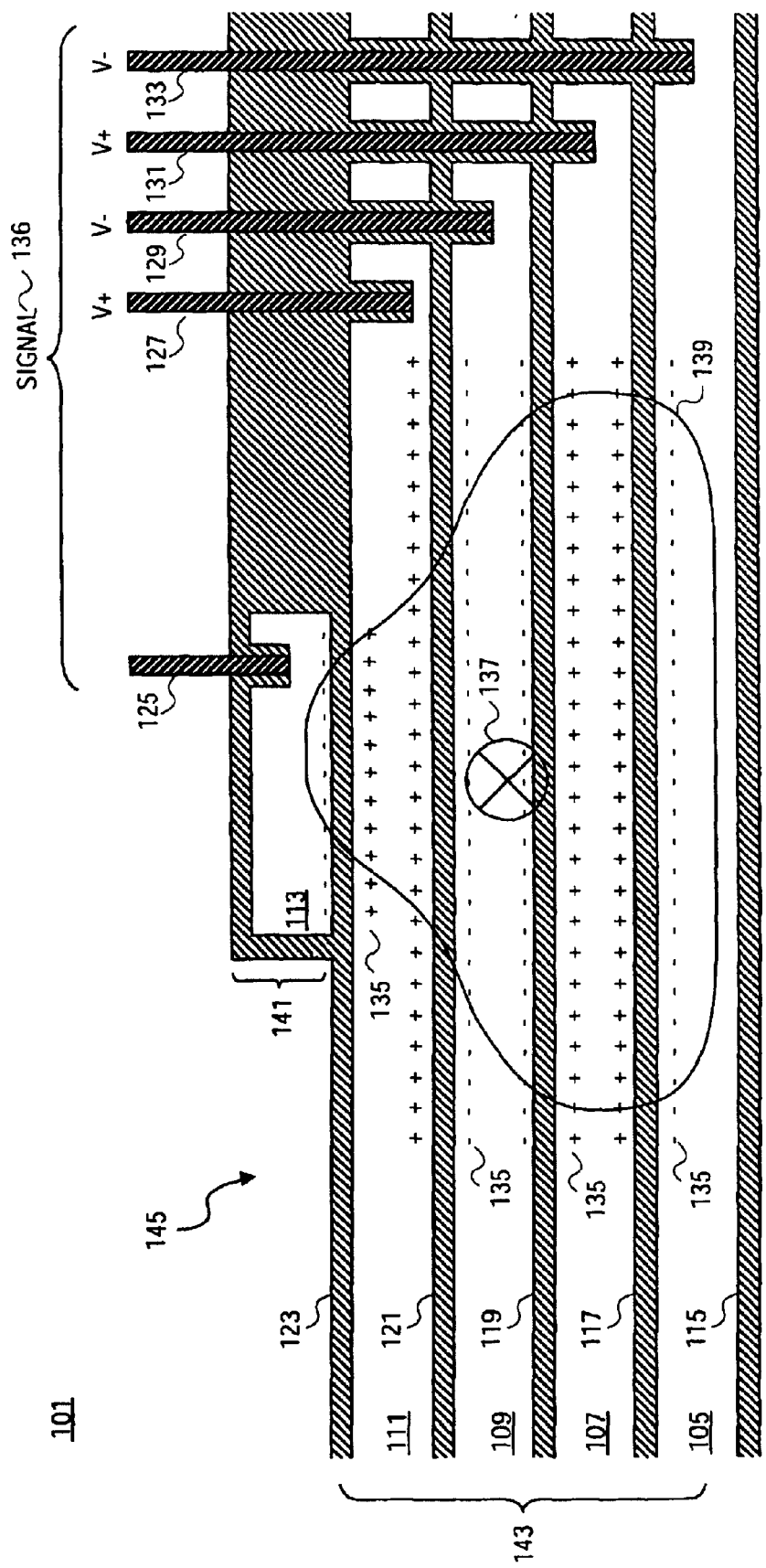
FIG. 1 is a cross-section illustration of one embodiment of an optical device including a plurality of alternating stacked layers of semiconductor material and insulating material in accordance with the teachings of the present invention.

To illustrate, FIG. 1 is a cross-section illustration of one embodiment of an optical device including a plurality of alternating stacked layers of semiconductor material and insulating material in accordance with the teachings of the present invention. As shown, an optical device 101 includes a plurality of layers of semiconductor material 103, 105, 107, 109, 111 and 113 and a plurality of layers of insulating material 115, 117, 119, 121 and 123. The semiconductor material layers and insulting material layers are alternatingly stacked such that one or more layers of insulating material are disposed between neighboring layers of semiconductor material in accordance with the teachings of the present invention.

As shown in the depicted embodiment, conductors 125, 127, 129, 131 and 133 are coupled to semiconductor material layers 113, 111, 109, 107 and 105, respectively. Accordingly, a signal 136 can be individually applied to each layer of semiconductor material 113, 111, 109, 107 and 105 to modulate charge layers 135 proximate to insulating material layers 117, 119, 121 and 123. In the illustrated example, signal 136 is illustrated as a V− signal applied to conductor 125 and semiconductor layer 113, a V+ signal applied to conductor 127 and semiconductor layer 111, a V− signal applied to conductor 129 and semiconductor layer 109, a V+ signal applied to conductor 131 and semiconductor layer 107 and a V− signal applied to conductor 133 and semiconductor layer 105. Accordingly, assuming that semiconductor layers 113, 109 and 105 include n-type doping and that semiconductor layers 111 and 107 include p-type doping and that optical device 101 operates in accumulation mode, modulated charge layers 135 proximate to the layers of insulating material as shown will include positive and negative charge carriers as illustrated in the example of FIG. 1.

It is appreciated of course that the doping polarities and concentrations of the semiconductor layers can be modified or adjusted and/or that optical device 101 can operate in other modes (e.g. inversion or depletion) in accordance with the teachings of the present invention. In addition, it is appreciated that varying ranges of voltage values for V− and V+ maybe utilized for signal 136 across conductors 125, 127, 129, 131 and 133 so as to realize modulated charge layers 135 in accordance with the teachings of the present invention.

In one embodiment, optical device 101 includes a waveguide 145 having an optical path 137 along which an optical beam 139 is directed. In one embodiment, optical beam 139 includes infrared or near infrared light. It is appreciated that optical beam 139 may include other wavelengths in the electromagnetic spectrum in accordance with the teachings of the present invention. In one embodiment, optical path 137 is along the axis of or substantially parallel to the axis of waveguide 145. In the example shown in FIG. 1, optical path 137 and therefore optical beam 139 are shown to propagate along a direction going through, or coming in and out of, the page.

As shown in the depicted embodiment, one embodiment of waveguide 145 is a rib waveguide including a rib region 141 and a slab region 143. The embodiment of FIG. 1 also shows that the intensity distribution of optical beam 139 is such that a portion of the optical beam 139 propagates through a portion of rib region 141 towards the interior of waveguide 145 and that another portion of optical beam 139 propagates through a portion of slab region 143 towards the interior of waveguide 145. As also shown with the intensity distribution of optical beam 139, the intensity of the propagating optical mode of optical beam 139 is vanishingly small at the "upper corners" of rib region 145 as well as the "sides" of slab region 143.

In one embodiment, the plurality of layers of semiconductor material 103, 105, 107, 109, 111 and 113 include silicon, polysilicon or another suitable semiconductor material that is at least partially transparent to optical beam 139. For example, it is appreciated that in other embodiments the plurality of layers of semiconductor material 103, 105, 107, 109, 111 and 113 may include a III–V semiconductor material such as for example GaAs or the like. In one embodiment, the plurality of layers of insulating material 115, 117, 119, 121 and 123 include an oxide material such as for example silicon oxide or another suitable material.

In one embodiment, the process to produce an optical device 101 may begin with a silicon-on-insulator (SOI) wafer having for example a buried oxide layer (e.g. insulating material layer 115) with a thickness of for example 1 to 4 μm and an epitaxial layer (e.g. semiconductor material layer 105) with a thickness of for example 300 to 400 nm. Afterwards, an oxide insulating layer (e.g. insulating material layer 117) having a thickness of for example 100 to 200 Å may then deposited by oxidation onto the semiconductor material layer 105, followed by a deposition of another semiconductor material layer (e.g. semiconductor material layer 107) having a thickness of for example 300 to 400 nm. In one embodiment, chemical mechanical polishing (CMP) may occur next to planarize the surface of semiconductor material layer 107 for the next oxidation if applicable to produce another oxide insulating layer (e.g. insulating material layer 119).

In one embodiment, the process is repeated until the appropriate number of alternating layers of semiconductor material and insulating material are formed. For example, in the embodiment illustrated in FIG. 1, waveguide 145 of optical device 101 includes five layers of semiconductor material 105, 107, 109, 111 and 113 alternating with six layers of insulating material 115, 117, 119, 121 and 123. It is appreciated of course that other embodiments of optical device 101 may include different numbers of layers in accordance with the teachings of the present invention.

In the depicted embodiment, conductors 125, 127, 129, 131 and 133 are then deposited into optical device 101. One embodiment of a process of depositing a conductor such as one of conductors 125, 127, 129, 131 and 133 is described in greater detail below in FIGS. 2A through 2E. As shown, conductors 125, 127, 129, 131 and 133 are deposited outside the optical path 137 of optical beam 139 in one embodiment of the present invention. In another embodiment, it is appreciated that additional conductors may be included in optical device 101 such that each layer of semiconductor material has a plurality of conductors from which signal 136 may be received. For example, in one embodiment, there are conductors on both sides of rib waveguide 145 outside the optical path 137 of optical beam 139.

In one embodiment, each of the layers of semiconductor material are biased in response to signal 136 voltages to modulate the concentration of free charge carriers in modulated charge layers 135. As shown in FIG. 1, optical beam 139 is directed through waveguide 145 along optical path 137 such that optical beam 139 is directed to overlap with the modulated charge layers 135. In one embodiment, optical beam 139 may be directed through a plurality of modulated charge layers 135 simultaneously. As a result of the modulated charge concentration in modulated charge layers 135, the phase of optical beam 139 is modulated in response to the modulated charge layers 135 and/or signal 136.

In one embodiment, the various layers of semiconductor material are doped to include free charge carriers such as for example electrons, holes or a combination thereof. In one embodiment, the free charge carriers attenuate optical beam 139 when passing through modulated charge layers 135. In particular, the free charge carriers of modulated charge layers 135 attenuate optical beam 139 by converting some of the energy of optical beam 139 into free charge carrier energy.

In one embodiment, the phase of optical beam 139 that passes through modulated charge layers 135 is modulated in response to signal 136. In one embodiment, the phase of optical beam 139 passing through free charge carriers of modulated charge layers 135 is modulated due to the plasma optical effect. The plasma optical effect arises due to an interaction between the optical electric field vector and free charge carriers that may be present along the optical path 137 of the optical beam 139. The electric field of the optical beam 139 polarizes the free charge carriers and this effectively perturbs the local dielectric constant of the medium. This in turn leads to a perturbation of the propagation velocity of the optical wave and hence the index of refraction for the light, since the index of refraction is simply the ratio of the speed of the light in vacuum to that in the medium. Therefore, the index of refraction in waveguide 145 is modulated in response to the modulated charge layers 135. The modulated index of refraction in waveguide 145 correspondingly modulates the phase of optical beam 139 propagating through waveguide 145. In addition, the free charge carriers are accelerated by the field and lead to absorption of the optical field as optical energy is used up. Generally the refractive index perturbation is a complex number with the real part being that part which causes the velocity change and the imaginary part being related to the free charge carrier absorption. The amount of phase shift φ is given by $$\phi = (2\pi/\lambda)\Delta nL \quad \text{(Equation 1)}$$

with the optical wavelength λ, the refractive index change Δn and the interaction length L. In the case of the plasma optical effect in silicon, the refractive index change Δn due to the electron ($\Delta N_e$) and hole ($\Delta N_h$) concentration change is given by:

$$\Delta n = -\frac{e^2\lambda^2}{8\pi^2 c^2 \varepsilon_0 n_0}\left(\frac{b_e(\Delta N_e)^{1.05}}{m_e^*} + \frac{b_h(\Delta N_h)^{0.8}}{m_h^*}\right) \quad \text{(Equation 2)}$$

where $n_o$ is the nominal index of refraction for silicon, e is the electronic charge, c is the speed of light, $\epsilon_0$ is the permittivity of free space, $m_e^*$ and $m_h^*$ are the electron and hole effective masses, respectively, $b_e$ and $b_h$ are fitting parameters. The amount of charge introduced into the optical path 137 of optical beam 139 increases with the number of layers of semiconductor material and insulating material used in optical device 101. The total charge may be given by:

$$Q = \sigma \times S \quad \text{(Equation 3)}$$

where Q is the total charge, σ is the surface charge density and S is the total surface area of all of the modulated charge layers 135 through which optical beam 139 is directed.

In one embodiment of optical device 101, a phase shift φ of optical beam 139 passing through the free charge carriers of modulated charge layers 135 has been achieved with a slope efficiency of 0.0165 π/volt of signal 136. In this embodiment of optical device 101, signal 139 has voltage values in the 10V range and the total surface area S of modulated charge layers 135 is approximately $2 \times 10^{-4} \mu m^2$. Accordingly, this embodiment of optical device 101 has an efficiency of $8.08 \times 10^{-7} \pi/V\mu m^2$. It is appreciated of course that the described embodiment represents only one embodiment of the present invention and that other embodiments of optical device 101 may have different slope efficiencies and/or surface areas S in accordance with the teachings of the present invention. Indeed, by changing the number of layers of semiconductor material and insulating material, the slope efficiencies and/or surface areas S can be adjusted accordingly. For instance, it is appreciated that optical devices can have shorter interaction lengths L and achieve the same amount of phase shift φ by increasing the number of layers of semiconductor material and insulating material in accordance with the teachings of the present invention.

FIGS. 2A through 2F are diagrams illustrating one embodiment of a process to dispose a conductor in an optical device to electrically couple one of the layers of semiconductor material to receive a signal in accordance with the teachings of the present invention. As shown in FIG. 2A, optical device 101 includes the plurality of layers of semiconductor material 105, 107, 109 and 111 alternating with the plurality of layers of insulating material 115, 117, 119, 121 and 123. FIG. 2B shows that in one embodiment a multilayer etch is then performed to form a trench or via 247 down to for example semiconductor material layer 105 through semiconductor material layers 111, 109 and 107 and through insulating material layers 123, 121, 119 and 117. FIG. 2C shows that in one embodiment, an insulating material 249 such as for example silicon dioxide is then deposited into via 247. FIG. 2D shows that in one embodiment another etch is performed to re-expose a portion of semiconductor material layer 105 from within via 247 through insulating material 249. FIG. 2E shows that conductor 133 is then deposited into via 247 to provide an insulated electrical coupling to semiconductor material layer 105. Indeed, conductor 133 is insulated from the remaining layers of semiconductor material 107, 109 and 111 with insulating material 249. In one embodiment, conductor 133 comprises metal or another suitable material that provides an electrical coupling to the corresponding layer of semiconductor material.

Figure 3:
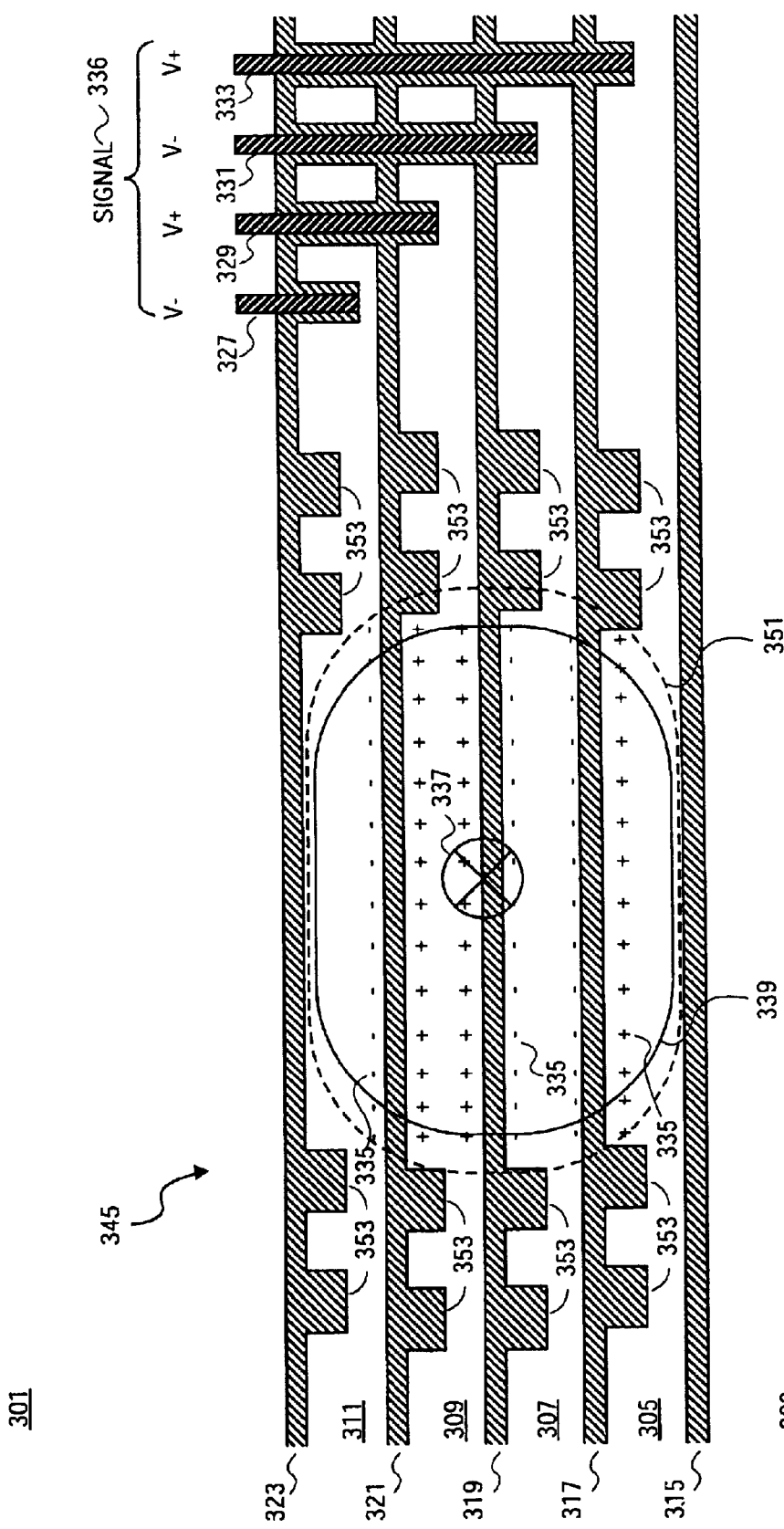
FIG. 3 is a cross-section illustration of another embodiment of an optical device including a plurality of alternating stacked layers of semiconductor material and insulating material with shallow longitudinal channels of insulating material in the layers of semiconductor material to define a mode confinement region in the optical device in accordance with the teachings of the present invention.

FIG. 3 is a cross-section illustration of another embodiment of an optical device 301 including a plurality of alternating stacked layers of semiconductor material and insulating material with shallow longitudinal channels of insulating material in the layers of semiconductor material to define a mode confinement region in the optical device in accordance with the teachings of the present invention. As shown in the depicted embodiment, optical device 301 includes a plurality of layers of semiconductor material 303, 305, 307, 309 and 311 and a plurality of layers of insulating material 315, 317, 319, 321 and 323. The semiconductor material layers and insulting material layers are alternatingly stacked such that one or more layers of insulating material are disposed between neighboring layers of semiconductor material in accordance with the teachings of the present invention.

As shown in the depicted embodiment, conductors 327, 329, 331 and 333 are coupled to semiconductor material layers 311, 309, 307 and 305, respectively. Accordingly, a signal 336 can be individually applied to each layer of semiconductor material 311, 309, 307 and 305 to modulate charge layers 335 proximate to insulating material layers 317, 319 and 321. In the illustrated example, signal 336 is illustrated as a V− signal applied to conductor 327 and semiconductor layer 311, a V+ signal applied to conductor 329 and semiconductor layer 309, a V− signal applied to conductor 331 and semiconductor layer 307 and a V+ signal applied to conductor 333 and semiconductor layer 305. Accordingly, assuming that semiconductor layers 311 and 307 include n-type doping and that semiconductor layers 309 and 305 include p-type doping and that optical device 301 operates in accumulation mode, modulated charge layers 335 proximate to the layers of insulating material as shown will include positive and negative charge carriers as illustrated in the example of FIG. 3.

It is appreciated of course that the doping polarities and concentrations of the semiconductor layers can be modified or adjusted and/or that optical device 301 can operate in other modes (e.g. inversion or depletion) in accordance with the teachings of the present invention. In addition, it is appreciated that varying ranges of voltage values for V− and V+ may be utilized for signal 336 across conductors 327, 329, 331 and 333 so as to realize modulated charge layers 335 in accordance with the teachings of the present invention.

In one embodiment, optical device 301 includes a waveguide 345 including an optical path 337 along which an optical beam 339 is directed. In one embodiment, optical path 337 is along the axis of or substantially parallel to the axis of waveguide 345. In the example shown in FIG. 3, optical path 337 and therefore optical beam 339 are shown to propagate along a direction going through, or coming in and out of, the page.

As shown in the depicted embodiment in FIG. 3, one embodiment of optical device 301 includes a plurality of shallow longitudinal channels of insulating material 353 extending from the layers of insulating material 323, 321, 319 and 317 into the layers of semiconductor material 311, 309, 307 and 305, respectively. In one embodiment, the shallow longitudinal channels of insulating material 353 are arranged to define a mode confinement region 351, which defines optical path 337 along which optical beam 339 is directed. In one embodiment, the shallow longitudinal channels of insulating material 353 provide cladding distributions that confine a mode of optical beam 339 to remain within waveguide 345 when propagating along optical path 337. The lack of shallow longitudinal channels of insulating material 353 in the mid section creates an effective index higher than in the surrounding region providing therefore confinement of optical beam 339 in mode confinement region 351.

Similar to the previously described embodiments, the plurality of layers of semiconductor material 303, 305, 307, 309 and 311 may include silicon, polysilicon, III–V semiconductor material or another suitable semiconductor material that is at least partially transparent to optical beam 339. The plurality of layers of insulating material 315, 317, 319, 321 and 323 may include an oxide material such as for example silicon oxide or another suitable material.

In one embodiment, the process to produce an optical device 301 may begin with an SOI wafer having for example a buried oxide layer (e.g. insulating material layer 315) and an epitaxial layer (e.g. semiconductor material layer 305). In one embodiment, shallow longitudinal trenches are etched into semiconductor layer 305 to define mode confinement region 351. Afterwards, an oxide insulating layer (e.g. insulating material layer 317) is then deposited onto the semiconductor material layer 305 and into the etched trenches such that the shallow longitudinal channels insulating material 353 are completely filled with insulating material. In one embodiment, CMP is executed next to remove excess oxide and to create a planar semiconductor surface with buried oxide channels. In one embodiment, this is followed by oxidation to create the insulating material layer 317. Next, another semiconductor material layer (e.g. semiconductor material layer 307) is deposited over insulating material layer 317. In one embodiment, CMP occurs next to planarize the surface of semiconductor material layer 307 for the next shallow longitudinal trench etching and oxidation if applicable to produce another oxide insulating layer (e.g. insulating material layer 319).

In one embodiment, the process is repeated until the appropriate number of alternating layers of semiconductor material and insulating material with shallow longitudinal channels of insulating material 353 are formed. For example, in the embodiment illustrated in FIG. 3, waveguide 345 of optical device 301 includes four layers of semiconductor material 305, 307, 309 and 311 alternating with five layers of insulating material 315, 317, 319, 321 and 323. It is appreciated of course that other embodiments of optical device 301 may include a different number of layers in accordance with the teachings of the present invention.

In the depicted embodiment, conductors 327, 329, 331 and 333 may then deposited into optical device 301 using a similar process that described above. In another embodiment, it is appreciated that additional conductors may be included in optical device 301 such that each layer of semiconductor material has a plurality of conductors from which signal 336 may be received. For example, in one embodiment, there are conductors on both sides of waveguide 345 outside the optical path 337 of optical beam 339.

In operation, each of the layers of semiconductor material are biased in response to signal 336 voltages to modulate the concentration of free charge carriers in modulated charge layers 335. As shown in FIG. 3, optical beam 339 is directed through waveguide 345 along optical path 337 such that optical beam 339 is directed to overlap with the modulated charge layers 335. In one embodiment, optical beam 339 may be directed through a plurality of modulated charge layers 335 simultaneously in accordance with the teachings of the present invention. As a result of the modulated charge concentration in modulated charge layers 335, the phase of optical beam 339 is modulated in response to the modulated charge layers 335 and/or signal 336.

Figure 4:
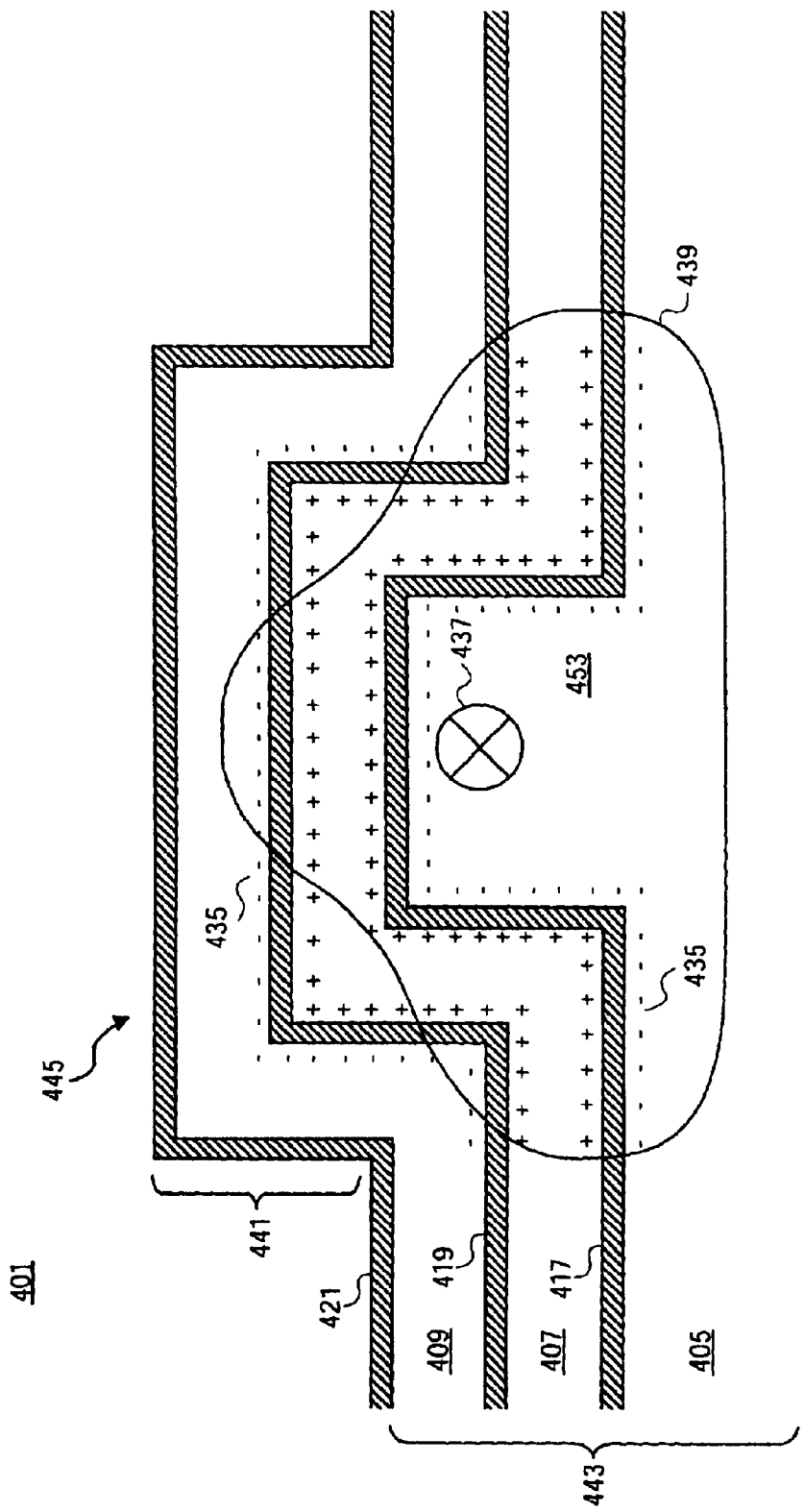
FIG. 4 is a cross-section illustration of yet another embodiment of an optical device including a plurality of alternating stacked layers of semiconductor material and insulating material with non-planar layers of insulating material in the optical device in accordance with the teachings of the present invention.

FIG. 4 is a cross-section illustration of yet another embodiment of an optical device 401 including a plurality of alternating stacked layers of semiconductor material and insulating material with non-planar layers of insulating material in the optical device in accordance with the teachings of the present invention. As shown in the depicted embodiment, optical device 401 includes a plurality of layers of semiconductor material 405, 407 and 409 and a plurality of layers of insulating material 417, 419 and 421. The semiconductor material layers and insulting material layers are alternatingly stacked such that one or more layers of insulating material are disposed between neighboring layers of semiconductor material in accordance with the teachings of the present invention.

In one embodiment, optical device 401 includes a waveguide 445 including an optical path 437 along which an optical beam 439 is directed. In one embodiment, optical path 437 is along the axis of or substantially parallel to the axis of waveguide 445. In the example shown in FIG. 4, optical path 437 and therefore optical beam 439 are shown to propagate along a direction going through, or coming in and out of, the page.

As shown in the depicted embodiment, one embodiment of waveguide 445 is a rib waveguide having a rib region 441 and a slab region 443. The embodiment of FIG. 4 also shows that the intensity distribution of optical beam 439 is such that a portion of the optical beam 439 propagates through a portion of rib region 441 towards the interior of waveguide 445 and that another portion of optical beam 439 propagates through a portion of slab region 443 towards the interior of waveguide 445. As also shown with the intensity distribution of optical beam 439, the intensity of the propagating optical mode of optical beam 439 is vanishingly small at the "upper corners" of rib region 445 as well as the "sides" of slab region 443.

In one embodiment, optical device 401 includes one or more non-planar layers of semiconductor material and/or layers of insulating material. For example, the plurality of layers of semiconductor material 405, 407 and 409 and a plurality of layers of insulating material 417, 419 and 421 are non-planar. As shown in the embodiment depicted in FIG. 4, waveguide 445 has a cross-section having an inverted "U" shape such that at least one or more of the insulating material layers 417, 419 and/or 421 are non-planar along the optical path 437 along which optical beam 439 is directed through waveguide 445. It is appreciated of course that other non-planar cross-section shapes may be utilized in accordance with the teachings of the present invention. In one embodiment, at least one or more of the layers of insulating material 417, 419 and/or 421 are formed at least partially around the axis running along the optical path 437. As a result, one or more of the layers of semiconductor material and/or one or more of the layers of insulating material is included in both rib region 441 and slab region 443 of rib waveguide 445. To illustrate, FIG. 4 shows for example that portions of the same insulating material layer 419 is included in both rib region 441 as well as slab region 443 of rib waveguide 445

With the above-described non-planar stacked structure of optical device 401, the total surface area S of modulated charge layers 435 proximate to the layers of insulating material is increased relative to planar layers of insulating material. Therefore, according to Equation 3 above, increased total charge Q may be provided with optical device 401. With an increased total charge Q, it is appreciated that additional modulation of optical beam 439 may be achieved in accordance with the teachings of the present invention. In one embodiment, conductors (not shown for brevity) are coupled outside the optical path to the layers of semiconductor material 405, 407 and 409 to modulate the charge concentration in modulated charge layers 435 in response to a signal.

In operation, each of the layers of semiconductor material are biased in response to signal voltages to modulate the concentration of free charge carriers in modulated charge layers 435. As shown in FIG. 4, optical beam 439 is directed through waveguide 445 along optical path 437 such that optical beam 439 is directed to pass through the modulated charge layers 435. As a result of the modulated charge concentration in modulated charge layers 435, the phase of optical beam 439 is modulated in response to the modulated charge layers 435.

Similar to the previously described embodiments, the plurality of layers of semiconductor material 405, 407 and 409 may include silicon, polysilicon, III–V semiconductor material or another suitable semiconductor material that is at least partially transparent to optical beam 439. The plurality of layers of insulating material 417, 419 and 421 may include an oxide material such as for example silicon oxide or another suitable material.

In one embodiment, the process to produce an optical device 401 may begin with an SOI wafer having for example a buried oxide layer and an epitaxial layer (e.g. semiconductor material layer 405). In one embodiment, additional processing occurs to result in semiconductor material layer 405 having a non-planar cross-section as illustrated in FIG. 4. Afterwards, an oxide insulating layer (e.g. insulating material layer 417) is then deposited by oxidation over the semiconductor material layer 405. In the depicted embodiment, since semiconductor material layer 405 is non-planar, insulating material layer 417 is also non-planar. Next, another semiconductor material layer (e.g. semiconductor material layer 407) is deposited over insulating material layer 417 and the process is repeated until the appropriate number of alternating non-planar layers of semiconductor material and insulating material are formed. For example, in the embodiment illustrated in FIG. 4, waveguide 445 of optical device 401 includes three non-planar layers of semiconductor material 405, 407 and 409 alternating with non-planar layers of insulating material 417, 419 and 421. It is appreciated of course that other embodiments of optical device 401 may include a different number of layers with non-planar modulated charge layers along optical path 437 in accordance with the teachings of the present invention.

Figure 5:
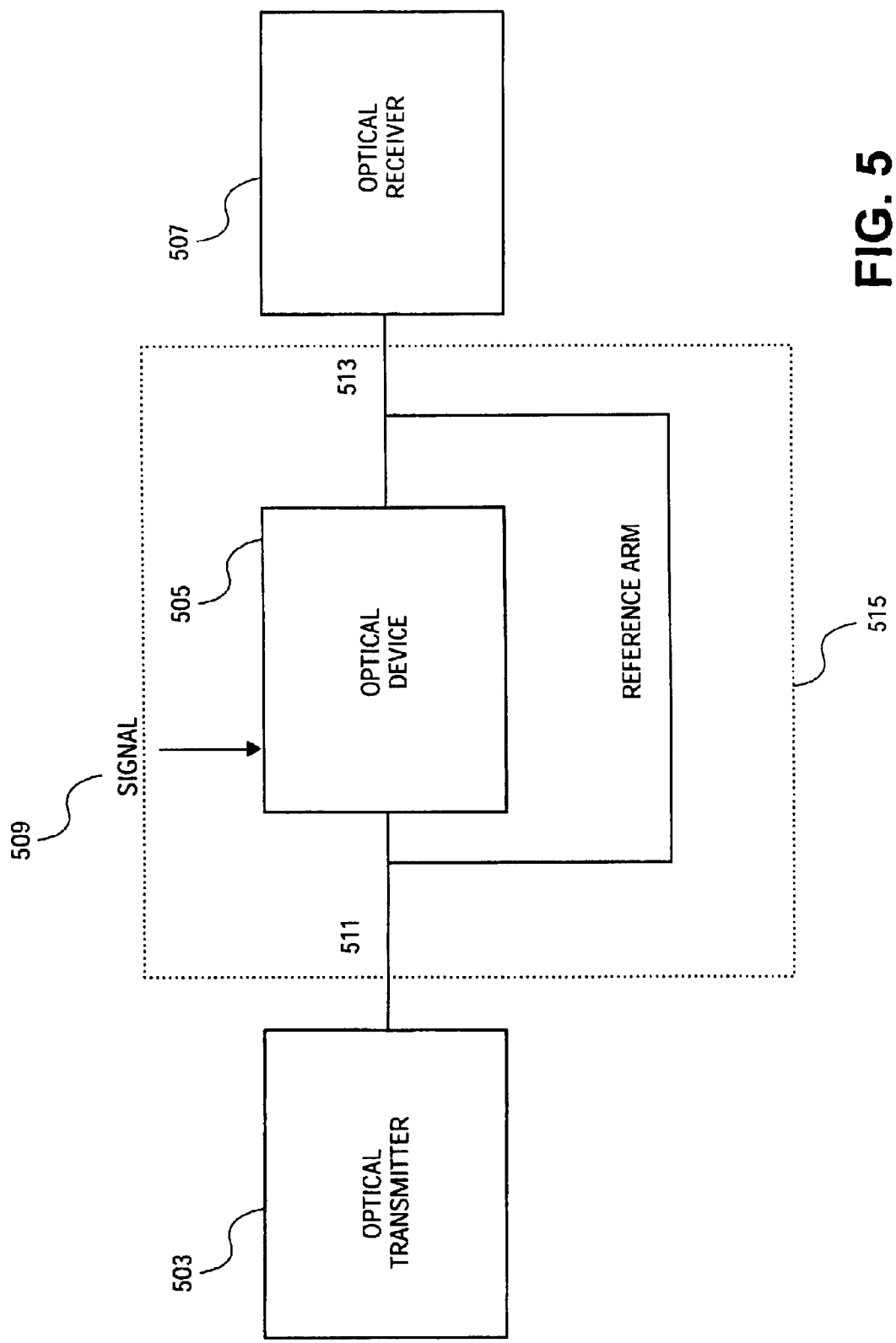
FIG. 5 is a block diagram illustration of one embodiment of a system including an optical transmitter and an optical receive with an optical device according to embodiments of the present invention to modulate a phase of an optical beam directed from the optical transmitter to the optical receiver.

FIG. 5 is a block diagram illustration of one embodiment of a system including an optical transmitter and an optical receiver with an optical device according to embodiments of the present invention to modulate a phase of an optical beam directed from the optical transmitter to the optical receiver. In particular, FIG. 5 shows optical system 501 including an optical transmitter 503 and an optical receiver 507. In one embodiment, optical system 501 also includes an optical device 505 optically coupled between optical transmitter 503 and optical receiver 507. As shown in FIG. 5, optical transmitter 503 transmits an optical beam 511 that is received by optical device 505. In one embodiment, optical device 505 may include for example a Mach-Zehnder interferometer 515 or another suitable device, which contains in one arm any one of the optical devices 101, 301 or 401 described above or another embodiment of an optical device in accordance with the teachings of the present invention. As shown in the depicted embodiment, the other arm (e.g. reference arm) of Mach-Zehnder interferometer 515 does not include an optical device 505. Accordingly, the phase of optical beam optical 511 is modulated due to interference between the two arms of the Mach-Zehnder interferometer 515 in response to a signal 509 received by optical device 505. A modulated optical beam 513 is then generated as a result from optical device 505, which is then directed from optical device 505 to optical receiver 507.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An apparatus, comprising:
    a plurality of alternating layers of semiconductor material and insulating material;
    a plurality of conductors, each of the conductors coupled to a respective one of the layers of semiconductor material to modulate charge layers proximate to the layers of insulating material; and
    a waveguide including an optical path along the plurality of alternating layers of semiconductor material and insulating material and through the charge layers proximate to the layers of semiconductor material.

2. The apparatus of claim 1 wherein the waveguide is a rib waveguide comprising a rib region and a slab region.

3. The apparatus of claim 1 further comprising shallow longitudinal channels of insulating material extending from the layers of insulating material into the layers of semiconductor material, the shallow longitudinal channels of insulating material defining a mode confinement region defining the optical path.

4. The apparatus of claim 1 wherein at least one of the layers of insulating material is non-planar along the optical path.

5. The apparatus of claim 4 wherein said at least one of the layers of insulating material is formed at least partially around an axis running along the optical path.

6. The apparatus of claim 2 wherein at least one of the layers of insulating material is included in both the rib region and the slab region of the rib waveguide.

7. The apparatus of claim 1 wherein each of the conductors are disposed outside the optical path.

8. The apparatus of claim 1 wherein an optical beam is to be directed along the optical path in a propagation direction substantially parallel to planes of the plurality of alternating layers of semiconductor material and insulating material.

9. A method, comprising:
    directing an optical beam along a waveguide including an optical path through a plurality of alternating layers of semiconductor material and insulating material;
    applying signals to a plurality of conductors, each of the conductors coupled to a respective one of the layers of semiconductor material; and
    modulating charge layers proximate to layers of insulating material in response to the applied signals, the optical beam directed through the modulated charge layers.

10. The method of claim 9 further comprising modulating an index of refraction along the optical path in response to the modulated charge layers.

11. The method of claim 9 further comprising modulating a phase of the optical beam directed along the optical path in response to the modulated charge layers.

12. The method of claim 9 further comprising confining the optical beam to remain within a mode confinement region including the optical path, the mode confinement region defined with shallow longitudinal channels of insulating material extending from the layers of insulating material into the layers of semiconductor material.

13. The method of claim 9 further comprising confining the optical beam to propagate along the optical path with a waveguide including the plurality of alternating layers of semiconductor material and insulating material.

14. The method of claim 9 wherein applying the signals to the plurality of conductors, each of the conductors coupled to the respective one of the layers of semiconductor material comprises coupling the each of the conductors to the respective one of the layers of semiconductor material outside the optical path.

15. The method of claim 9 wherein at least one of the plurality of alternating layers of semiconductor material and insulating material is non-planar along the optical path.

16. A system, comprising:
    an optical transmitter to generate an optical beam;
    an optical receiver optically coupled to receive the optical beam;
    an optical device optically coupled between the optical transmitter and the optical receiver, the optical device to modulate a phase of the optical beam, the optical device including:
        a plurality of alternating layers of semiconductor material and insulating material;
        a plurality of conductors, each of the conductors coupled to a respective one of the layers of semiconductor material to modulate charge layers proximate to the layers of insulating material between layers of semiconductor material; and
        a waveguide including an optical path through at least one of the modulated charge layers.

17. The system of claim 16, wherein the waveguide comprises a rib waveguide.

18. The system of claim 16 wherein the optical device comprises a mode confinement region defining the optical path, the mode confinement region defined with shallow longitudinal channels of insulating material extending from the layers of insulating material into the layers of semiconductor material.

19. A method, comprising:
    providing a plurality of alternating layers of semiconductor material and insulating material;
    etching a plurality of vias down to each respective one of the plurality of layers of semiconductor material;
    depositing insulating material into each of the plurality of vias;
    implanting a plurality of conductors into each respective one of the plurality of vias, each one of the plurality of conductors coupled to a respective one of the plurality of layers of semiconductor material; and
    coupling each of the plurality of conductors to receive a respective signal to modulate charge layers proximate to the layers of insulating material to modulate a phase of an optical beam to be directed along a waveguide including an optical path along the plurality of alternating layers of semiconductor material and insulating material.

20. The method of claim 19 wherein forming the optical waveguide comprises:
    forming the slab region of an optical rib waveguide; and
    forming the rib region of the optical rib waveguide.

21. The method of claim 19 wherein providing the plurality of alternating layers of semiconductor material and insulating material comprises:
    etching shallow longitudinal trenches in a first layer of semiconductor material disposed on a first layer of insulating material, the shallow longitudinal trenches arranged in the first layer of semiconductor material defining a mode confinement region including the optical path;
    depositing a second layer of insulating material over the first layer of semiconductor material;

disposing a second layer of semiconductor material over the second layer of insulating material;

etching shallow longitudinal trenches in the second layer of semiconductor material, the shallow longitudinal trenches arranged in the second layer of semiconductor material further defining the mode confinement region including the optical path; and depositing a third layer of insulating material over the second layer of semiconductor material.

22. The method of claim 19 wherein providing the plurality of alternating layers of semiconductor material and insulating material comprises:

disposing a first non-planar layer of semiconductor material over a layer of insulating material;

depositing a first non-planar layer of insulating material over the first non-planar layer of semiconductor material;

disposing a second non planar layer of semiconductor material over the first non-planar layer of insulating material; and depositing a second non-planar layer of insulating material over the second non-planar layer of semiconductor material.

23. The method of claim 22 wherein at least the first non-planar layer of insulating material is formed at least partially around an axis running along the optical path.

* * * * *